(12) United States Patent
Robins

(10) Patent No.: US 7,967,353 B2
(45) Date of Patent: Jun. 28, 2011

(54) CLEVIS TYPE GRAB HOOK WITH SAFETY LATCH

(76) Inventor: Terry K. Robins, Minneapolis, KS (US)

(*) Notice: Subject to any disclaimer, the term of this patent is extended or adjusted under 35 U.S.C. 154(b) by 356 days.

(21) Appl. No.: 12/233,787

(22) Filed: Sep. 19, 2008

(65) Prior Publication Data
US 2009/0079213 A1    Mar. 26, 2009

Related U.S. Application Data

(60) Provisional application No. 60/994,968, filed on Sep. 25, 2007.

(51) Int. Cl.
B66C 1/34 (2006.01)
(52) U.S. Cl. ............. 294/82.17; 24/599.2; 24/601.5
(58) Field of Classification Search ............ 294/82.1, 294/81.56, 82.17, 82.19, 82.11; 24/599.1, 24/599.2, 601.5
See application file for complete search history.

(56) References Cited

U.S. PATENT DOCUMENTS

| 3,501,817 | A | * | 3/1970 | Bambenek et al. | 294/82.19 |
| 3,795,951 | A |   | 3/1974 | Ratcliff |  |
| 5,292,165 | A | * | 3/1994 | Wiklund | 294/82.33 |
| 5,517,735 | A | * | 5/1996 | Tsai | 24/599.9 |
| 5,577,787 | A | * | 11/1996 | Klope | 294/82.19 |
| 5,889,512 | A | * | 3/1999 | Moller et al. | 345/179 |
| 6,019,408 | A | * | 2/2000 | Bennett, Jr. | 294/82.17 |
| D503,328 | S | * | 3/2005 | Catlett | D8/342 |
| 2007/0126251 | A1 | * | 6/2007 | Olson et al. | 294/82.17 |

OTHER PUBLICATIONS

Industrial Rope Supply Company, Inc. of Cincinnati, Ohio, www.industrialrope.com/chainhks, Aug. 22, 2008, pp. 1-2.

* cited by examiner

Primary Examiner — Saúl J Rodríguez
Assistant Examiner — Stephen Vu
(74) Attorney, Agent, or Firm — Banner & Witcoff, Ltd

(57) ABSTRACT

A grab hook includes a locking plate which is held in position by a biased pin that may be axially extended to move the locking plate between a latching and unlatching position to close or open the slot in the grab hook.

14 Claims, 5 Drawing Sheets

CLEVIS TYPE GRAB HOOK WITH SAFETY LATCH

CROSS REFERENCE TO RELATED APPLICATION

This is a nonprovisional application based on provisional application Ser. No. 60/994,968 filed Sep. 25, 2007 entitled "Safety Grab Hook (Clevis Type)" for which priority is claimed and which is incorporated herewith in its entirety by reference thereto.

BACKGROUND OF THE INVENTION

In a principal aspect the present invention relates to a clevis type grab hook with a safety latch designed, for example, to retain a chain, a chain link, or similar element within the slot of the hook.

Grab hooks may be designed to engage and retain a chain by engaging one or more links thereof. Such a grab hook may be termed a chain hook. Typically, a chain hook is classified as an eye type chain hook or, alternatively, a clevis type chain hook. U.S. Pat. No. 3,795,951, which is incorporated herewith by reference, discloses a grab hook construction with clevis, i.e. clevis type chain hook. FIG. 4 of U.S. Pat. No. 3,795,951 depicts a very common type of clevis type chain hook. Clevis type grab hooks or chain hooks are subcategorized as a "clevis grab" hook or a "clevis slip" hook. A clevis grab hook is typically designed to engage and hold one link of a chain in the slot of the hook. A clevis slip type hook has a more pronounced enlarged slot for engaging and holding a chain, cable or the like. Such clevis type grab hooks are depicted in literature made available by Industrial Rope Supply Company, Inc. of Cincinnati, Ohio having a website at http://www.industrialrope.com. The information at that site is incorporated herewith by reference.

Engagement of chain link with a throat opening of a grab hook is typically a straightforward operation. Retention of the chain link within such a hook construction may, however, be thwarted in some fashion such that the link will disengage or slip out from the slot of the hook. That is, insuring that the chain link remains within the slot or throat opening of a hook construction is a desirable undertaking. The present invention is directed to such a construction.

SUMMARY OF THE INVENTION

Briefly, the present invention comprises a clevis type chain hook or grab hook which includes a throat opening or slot into which a chain link or chain, or cable or line may be positioned. The grab hook further includes a latch member for closing or blocking the open end of the slot or throat of the grab hook. More specifically, a pin such as a clevis pin associated with the hook is elongated and includes a latch member attached at one end. The clevis pin fits through at least one set of bifurcated or spaced clevis arms associated with the grab hook. The opposite end of the clevis pin is biased to maintain the latch member engaged against one of the clevis arms. The latch plate includes a section that fits generally against or flush over the clevis arm and a second section which fits over the throat opening or open slot of the grab hook. The latch plate further may include at least one leg extending to engage the side of the grab hook and preclude the latch plate from being rotated out of a locked position once the latch plate is placed over the throat opening or slot of the grab hook. Release of the latch plate from its latched position is effected by moving the clevis pin axially against the biasing element that normally maintains the pin in a latching position. The clevis pin thus may be extended outwardly from the bifurcated clevis arms and rotated to reveal and open the slot opening or throat of the grab hook.

Thus, it is an object of the invention to provide a grab hook with a latching mechanism that may be opened and closed to provide access to, or preclude access to, the throat or slot of the grab hook.

Another object of the invention is to provide a biased latch plate which is maintained in position by a biasing member but which may be released from that position by manual engagement.

A further object of the invention is to provide a simple yet highly reliable latching mechanism to provide a safety latch for a clevis type grab hook.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF AN EMBODIMENT OF THE INVENTION

Figure 1:
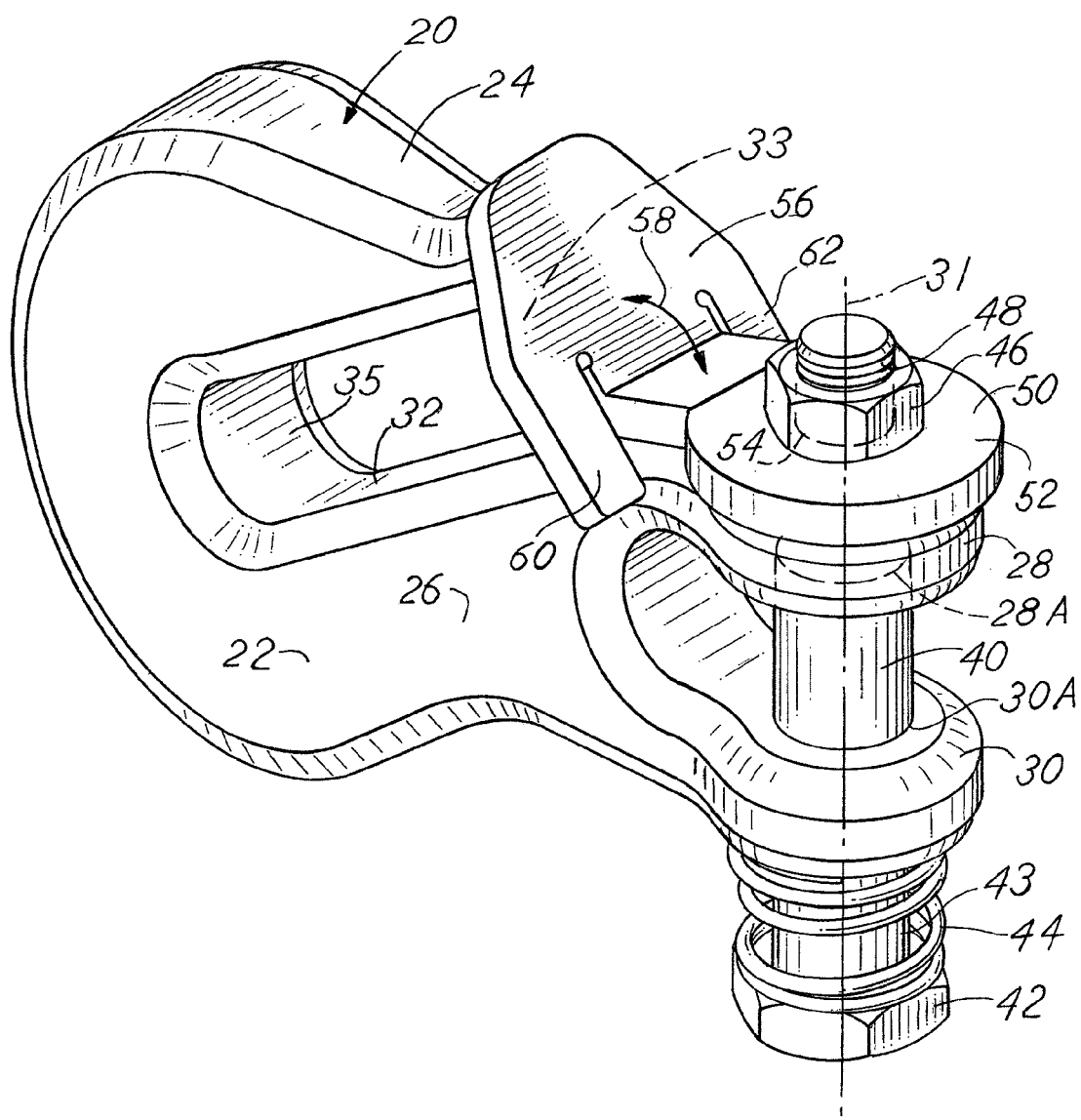
FIG. 1 is an isometric view of the grab hook of the invention.
Figure 2:
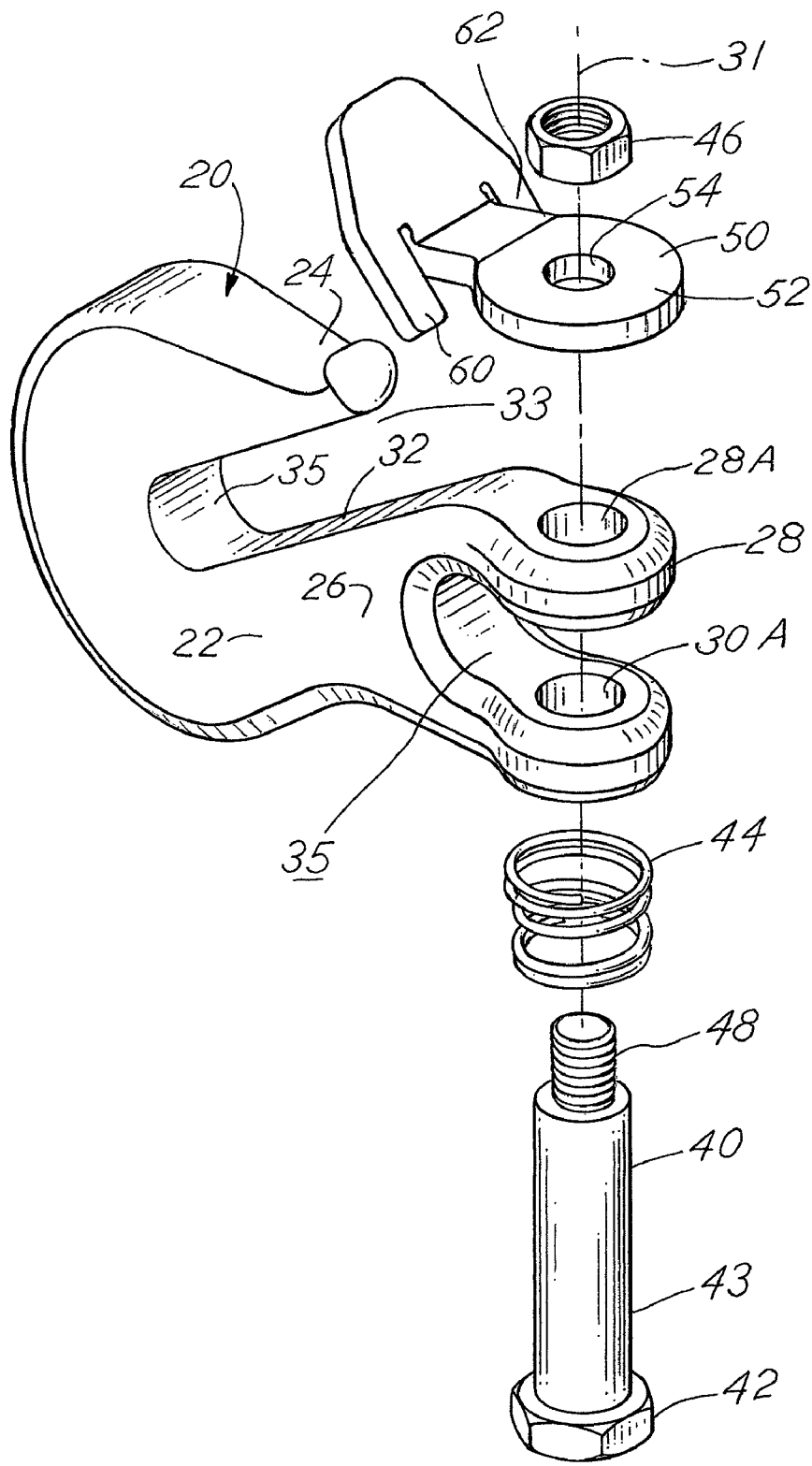
FIG. 2 is an exploded isometric view of the grab hook of FIG. 1.
Figure 4:
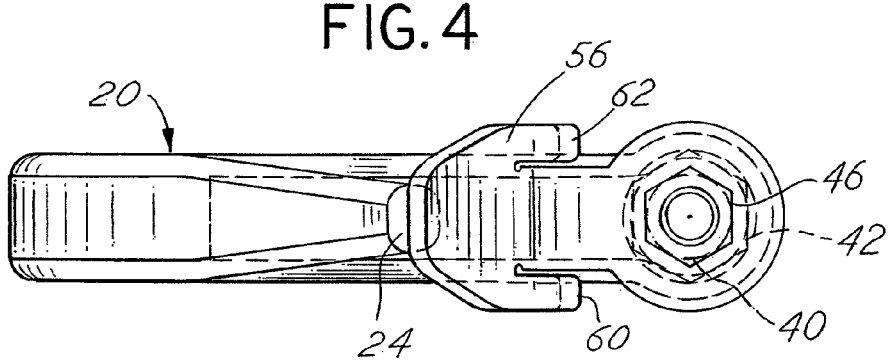
FIG. 4 is a top view of the grab hook of FIG. 3.
Figure 3:
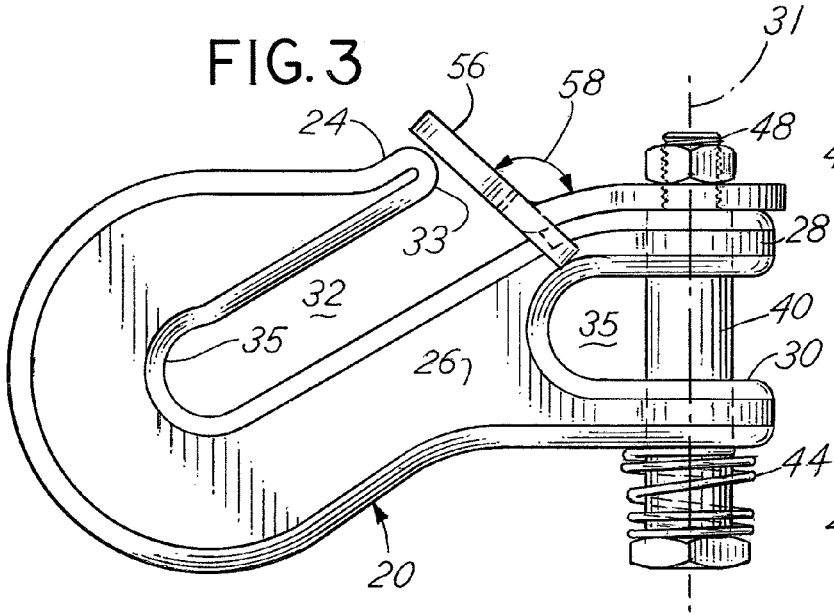
FIG. 3 is a side elevation of the grab hook of FIG. 1.
Figure 5:
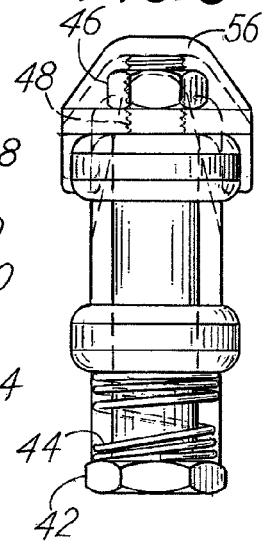
FIG. 5 is a right side end view of the grab hook of FIG. 3.
Figure 6:
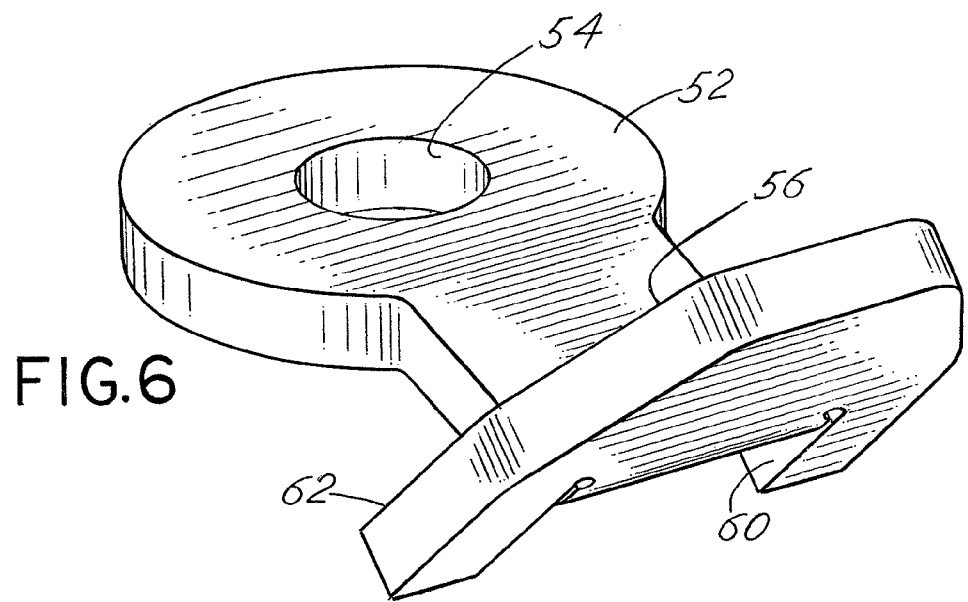
FIG. 6 is an isometric view of the latch element of the grab hook embodiment of FIG. 1.

Referring first to FIGS. 1-6, there is illustrated a grab hook 20 generally known as a clevis type grab hook. The grab hook 20 includes a body 22 with a tip end 24 spaced from a shank end 26. Extending outwardly from the shank end 26 is a clevis comprising a first arm 28 and a spaced, generally parallel second arm 30 defining a slot 35. The arms 28 and 30 each include a cylindrical throughpassage 28A and 30A, respectively. Passages 28A and 30A are coaxial with an axis 31.

The tip end 24 is spaced from the shank end 26 to define an elongate slot 32 having an open end 33 and a generally arcuate, closed end 35. The slot 32 is sized to receive a link (not shown in FIGS. 1-6) of a chain. The link typically fits sideways into the slot 32 as illustrated, for example, in FIG. 7. However, the slot 32 may be sized and/or shaped to receive a cable, a rod, and other similar items.

Figure 7:
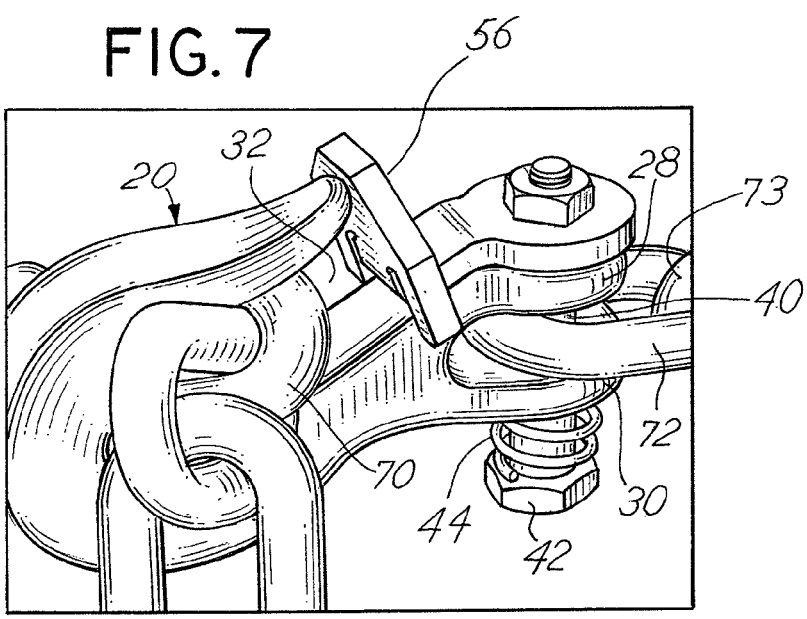
FIG. 7 is an isometric view illustrating a manner of use of the grab hook of FIG. 1.

The arms 28 and 30 are spaced to comprise a slot 35 to receive, by way of example, a chain link therebetween. An elongate clevis pin 40 fits through the passages or openings 28A and 30A and is slidable therethrough. The elongate pin 40 is coaxial with the axis 31 and axially moveable. Pin 40 includes a head 42 with a spiral spring 44 around a shank 43 so that the spiral spring 44 may be retained between the arm 30 and the head 42 to bias the pin 40 axially. The opposite end of the pin 40 includes a nut or fastener 46 attached to threads 48 to thereby retain a closure plate 50 mounted on the pin 40. The pin 40 may be fitted through the opening in a chain link as shown in FIG. 7 for example.

The closure plate 50 includes a first planar plate section 52 with an opening 54 therethrough for receipt of the pin 40. The closure plate section 52 is joined to a second section 56 forming an obtuse angle 58 therewith. The second section 56 is sized to fit over the slot 32. The second section 56 includes extended lateral side legs or projections 60 and 62 that are spaced to fit on opposite sides of the body 22 of the grab hook 20.

The pin 40 and thus the plate 56 are rotatable about the axis 31 once the pin 40 is moved axially by engaging the head 42 and lifting the legs 60, 62 of plate 56 from engagement with the body 22 and, more particularly, by disengaging the legs 60 and 62 with the sides of the body 22.

The clevis type grab hook thus may be utilized in any of a number of ways. For example, as depicted in FIG. 7 a link 70 may be fitted into the slot 32. The safety plate or second plate section 56 may then be fitted over the open end of the slot 32. A separate chain link 72 associated with a chain 73 may also be retained by fitting between the clevis arms 28 and 30 and held in position by the pin 40. In any event, the plate section 56 may be released from covering the slot 32 by depressing the head 42 against the biasing force of spring 44 and moving the pin 40 axially to thereby permit rotation about axis 31 and release of the plate 56 and removal of chain link 70 from the slot 32.

Figure 8:
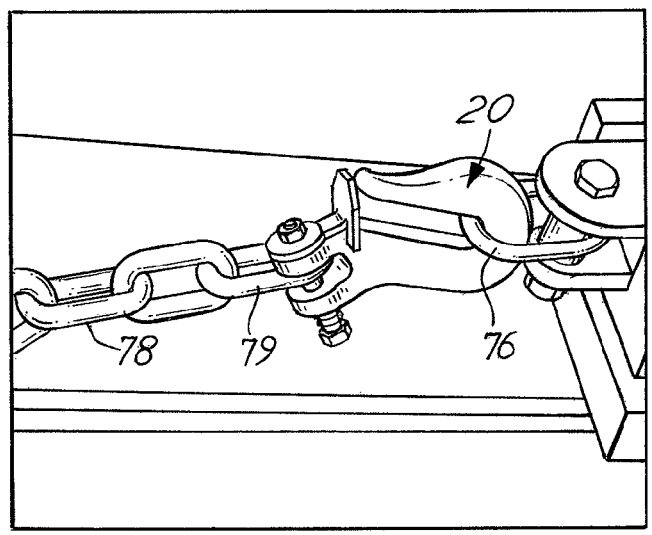
FIG. 8 is an isometric view illustrating another use of the grab hook of FIG. 1.

FIG. 8 depicts another use of the grab hook 20. That is, the grab hook 20 may be fitted around a link 76. A link 79 of a chain 78 may also be engaged with the clevis pin 40 and the chain 78 may be pulled. This Figure further demonstrates the strength or integrity of the embodiment depicted as a result of the use of a heavy gauge plate 50.

Figure 9:
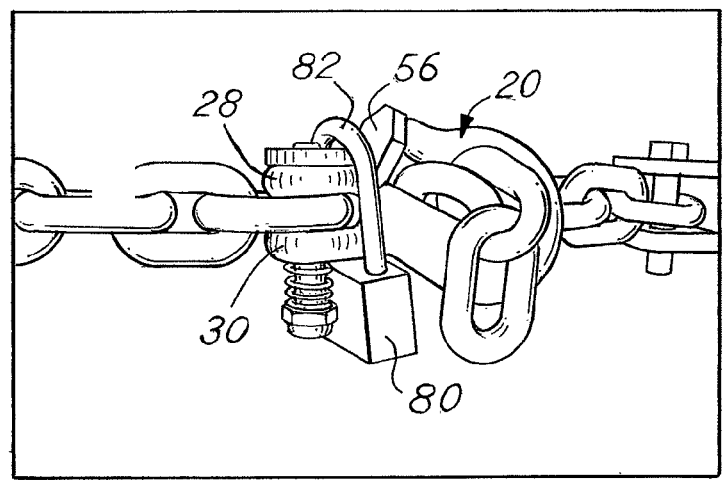
FIG. 9 is an isometric view of the use of the grab hook in combination with a padlock to lock a chain in a fixed attached configuration.
Figure 10:
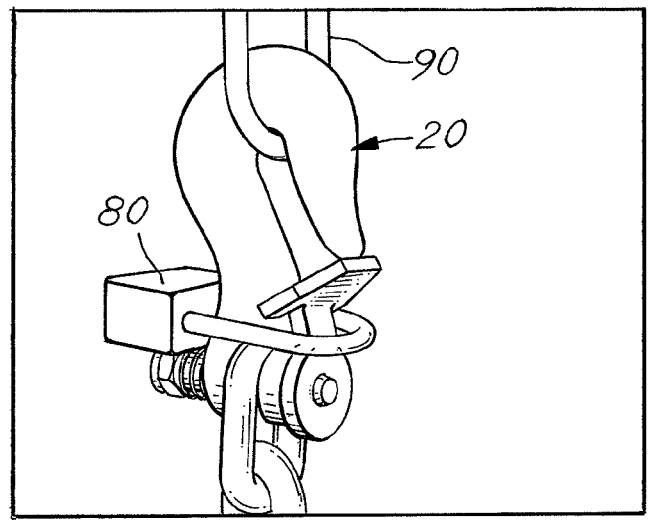
FIG. 10 is an isometric view of a further manner of use of the grab hook of the invention as a latch or lock for a door or similar closure or to prevent removal of a chain from a storage facility or use by an unauthorized person.

FIGS. 9 and 10 illustrate yet additional uses of the grab hook 20. A lock or padlock 80 with an elongate shackle 82 may be fitted over the arms 28 and 30 and against the plate 56 and then locked to thereby retain the plate 56 in a fully locked position retained by the shackle of the lock 80. Thus, the grab hook 20 is maintained in the locked position by virtue of the interaction of the lock 80 with the plate 56.

In FIG. 10 a similar use is illustrated to provide a connection to a handle or ring 90. Lock 80 is positioned to insure that the grab hook 20 will be retained in position with the ring 90. The ring 90 may be a closure mechanism, e.g. hasp, for a door or chest or container maintained in a locked position by virtue of engagement of the grab hook 20 combined with the padlock 80. The chain hook thus is highly useful as a security device in combination with padlock 80 preventing theft of a chain as well as useful as a locking device in combination with a chain.

The grab hook may be used in combination with various types of chains, cables, bars, rods, locks and the like. The feature of a biased locking plate incorporated with a clevis type grab hook is thus not limited to cooperation with a chain link. The end slot of the grab hook may therefore be sized and shaped to accommodate various elements and a compatible plate may be utilized therewith. The plate 50 may be a heavy gauge plate steel or a cast member. The invention may be incorporated into non-clevis type chain hooks by use of a biased pin fitted through a formed passage in the shank end of a hook. The pin 40 may be headed with a nut at one end or formed with flanges at opposite ends. Washers may be inserted beneath the head, nut or flange. The spring may be coiled about pin 40 or other biasing mechanisms may be used. Consequently, while there has been set forth an embodiment of the invention, it is to be understood that the invention is limited only by the following claims and equivalents thereof.

What is claimed is:

1. In a grab hook, including a hook body with a tip end, a shank end with a clevis having a through passage, said passage having an axis, said tip end and shank end spaced to define an elongate, receiving slot with an open side, the improvement comprising a latch member mechanism for substantially closing the open side of the receiving slot by fitting over the tip end, said latch member mechanism including a pin with a pin axis, said pin slidably fitted through the shank end through passage, said latch member mechanism further including a closure plate with a first plate section mounted to the pin, said closure plate further including a second plate section joined to the first plate section and extending over the tip end to cover the open side of the receiving slot, said first plate section and second plate section mounted to the pin for rotation about the pin axis to cover or uncover the open side of the receiving slot, and further including a spring member biasing mechanism for biasing said closure plate to engage with said grab hook body.

2. The improvement of claim 1 wherein the pin is rotatably attached at one end to the first plate section.

3. The improvement of claim 1 wherein the pin is axially moveable in the clevis through passage.

4. The improvement of claim 3 wherein the pin is biased axially.

5. The improvement of claim 3 wherein the closure plate includes first and second spaced legs extendable along opposite sides of the hook body to limit rotation of the plate about the pin axis.

6. The improvement of claim 1 wherein the latch member mechanism is comprised of the first plate section which fits against the shank end of the grab hook.

7. The improvement of claim 1 wherein the closure plate includes at least one depending leg to limit rotation of the closure plate about the pin axis.

8. The improvement of claim 1 wherein the closure plate includes first and second spaced legs extendable along opposite sides of the hook body to limit rotation of the closure plate about the pin axis.

9. The improvement of claim 1 wherein the first plate section of the closure plate forms an obtuse angle with the second plate section.

10. The improvement of claim 1 wherein the second plate section of the closure plate engages the tip end when the second plate section covers the receiving slot.

11. The improvement of claim 1 wherein the first plate section is fitted against the hook body and the second plate section is fitted over the open slot when the second plate section covers the receiving slot.

12. The improvement of claim 11 wherein the first plate section and second plate section are a unitary member and form an obtuse angle with respect to each other.

13. The improvement of claim 1 wherein said spring member biasing mechanism is mounted on said pin for biasing said pin axially.

14. In a hook body with a tip end, a shank end with a clevis having a through passage, said through passage having a axis, said tip end and said shank end spaced to define an elongate receiving slot with an open side, the improvement comprising:

a latch member mechanism for substantially closing the open side of the receiving slot by fitting over the tip end, said latch member mechanism including a pin with a pin axis, said pin slidably fitted through the shank end through passage, said latch member mechanism further comprising a closure plate including a first plate member rotatably attached to the pin, said closure plate further including a second plate member extending over the tip end to cover the hook tip end and open side of the receiving slot, said closure plate rotatable about the pin axis to uncover the open side of the receiving slot, said closure plate including at least one depending leg for engaging the grab hook body to thereby limit rotation of the closure plate, said pin axially biased by a spring member biasing mechanism to engage the closure plate and maintain the closure plate positioned to cover the hook tip end and open side of the slot with the second plate member fitted over the tip end engaging the tip end.

* * * * *